United States Patent
Higgins et al.

(10) Patent No.: US 12,481,063 B1
(45) Date of Patent: Nov. 25, 2025

(54) LOW LATENCY ADAPTIVE FILTER

(71) Applicant: ALKEN Inc., Colchester, VT (US)

(72) Inventors: Robert F. Higgins, South Burlington, VT (US); Henry E. Himberg, Williston, VT (US)

(73) Assignee: ALKEN Inc., Colchester, VT (US)

( * ) Notice: Subject to any disclaimer, the term of this patent is extended or adjusted under 35 U.S.C. 154(b) by 1041 days.

(21) Appl. No.: 17/218,276

(22) Filed: Mar. 31, 2021

Related U.S. Application Data

(60) Provisional application No. 63/003,512, filed on Apr. 1, 2020.

(51) Int. Cl.
| | |
|---|---|
| *G01S 17/66* | (2006.01) |
| *G01S 13/66* | (2006.01) |
| *G01S 15/66* | (2006.01) |
| *G01S 17/58* | (2006.01) |

(52) U.S. Cl.
CPC ............... *G01S 17/66* (2013.01); *G01S 17/58* (2013.01); *G01S 13/66* (2013.01); *G01S 15/66* (2013.01)

(58) Field of Classification Search
CPC .......... G01S 17/66; G01S 17/58; G01S 13/66; G01S 13/72
See application file for complete search history.

(56) References Cited

U.S. PATENT DOCUMENTS

| | | | |
|---|---|---|---|
| 7,640,106 B1 * | 12/2009 | Stokar | G01C 21/166 |
| | | | 702/92 |
| 2018/0329505 A1 * | 11/2018 | Takahashi | G06F 3/04883 |
| 2020/0120631 A1 * | 4/2020 | Nurminen | H04W 4/025 |

* cited by examiner

*Primary Examiner* — Minh Q Phan

(74) *Attorney, Agent, or Firm* — Lerner David LLP

(57) ABSTRACT

An apparatus and method for determining position and orientation (PnO) of an object within an environment using an electromagnetic tracking system. An adaptive filter is used to strike a tradeoff between low jitter and low latency. When the object is slow moving or stationary, the adaptive filter is set to filter out jitter from the electromagnetic tracking system. When the object is in motion, the adaptive filter is set to reduce latency of the electromagnetic tracking system. An amount of motion of the object is monitored using a non-magnetic tracking device, whereby the setting of the adaptive filter is controlled based on the monitored motion using signals from the non-magnetic tracking device.

20 Claims, 3 Drawing Sheets

US 12,481,063 B1

LOW LATENCY ADAPTIVE FILTER

CROSS-REFERENCE TO RELATED APPLICATIONS

The present application claims the benefit of the filing date of U.S. Provisional Patent Application No. 63/003,512 filed Apr. 1, 2020, the disclosure of which is hereby incorporated herein by reference.

TECHNICAL FIELD

The present disclosure generally relates to electromagnetic tracking systems.

BACKGROUND

Electromagnetic tracking systems determine position and orientation (PnO) of a tracked object within a tracking environment using measurements of a multi-dimensional magnetic field generated by the system. The system applies knowledge of the magnetic field structure to determine the PnO of its respective sensors within the tracking environment. This provides high performance tracking in terms of measurement rate, accuracy, repeatability, and precision.

However, the field strength of the generated magnetic field decreases exponentially, and more particularly in proportion with a cube of the distance between the magnetic field source and sensors. This exponential drop in magnetic field strength, manifests itself as jitter in the system measurements. Jitter can also be caused by uncorrelated interfering magnetic fields. In order to maintain low jitter in the system measurements, the sensor data is typically run through a low-pass filter. However, this filtering increases the latency of the system, thus adding a delay from when the tracked object moves until when the movement is indicated by the system.

One approach for improving the tradeoff between jitter and latency is to provide an adaptive filter. The adaptive filter can be used to control an amount of filtering performed based on whether the sensor is in motion. For example, when the sensor is in motion and jitter is less impactful on the system measurements, latency induced by adaptive filter may be decreased. Conversely, when the sensor is not in motion and jitter has a greater impact on the system measurements, latency induced by the adaptive filter may be increased. Stated another way, the adaptive filter works by transitioning between filter settings based on detected motion of the sensors, performing more filtering when the sensors are stationary and performing less filtering when the sensors are in motion.

Although this approach works when the sensors are close to the magnetic field source, it is less effective as the sensors move farther away from the source and the magnetic field strength drops exponentially or when there is noise from an interfering source. This is because the very measurements that are used to control transition of the adaptive filter between filter settings are the measurements that are being filtered. By definition, these measurements have noise content and, therefore, are not reliable for controlling the adaptive filter.

In order to rely on the electromagnetic tracking system sensor measurements in spite of the inherent noise content, the electromagnetic system may include a pre-filter in the sensor's velocity estimation, which is a key parameter for controlling the adaptive filter. While the pre-filter improves the velocity estimation, it also introduces delay in the adaptive filter's transition. This introduced delay is in addition to the delay that already exists in the adaptive filter itself.

SUMMARY

The present disclosure describes an electromagnetic tracking system that maintains low jitter, low latency, and fast transitions between filter settings. This is accomplished by controlling the adaptive filter using measurements of sensor motion from a non-magnetic tracking device. The non-magnetic tracking device does not suffer the same exponential reduction of signal strength as the distance between the source and sensor increases. The non-magnetic tracking device is also not subject to interference from magnetic fields. Therefore, the non-magnetic tracking device provides accurate and reliable measurements of sensor motion even as the sensors move farther away from the magnetic source. As a result, the system can achieve a lower latency than another system including a fixed pre-filter, and can also transition between filter settings without a built-in delay.

An aspect of the disclosure is directed to an apparatus including: memory for storing instructions; and one or more processors for executing the instructions. The instructions stored in the memory may be configured to cause the one or more processors to: receive first electrical signals from a receiver circuit including a plurality of receiver elements aligned at different receiver axes, each receiver element configured to detect a magnetic field along its respective axis, the first electrical signals being indicative of a position and orientation (PnO) of a first object according to a frame of reference defined by a second object; receive second electrical signals from a non-magnetic tracking device, the second electrical signals being indicative of an amount of motion of the first object relative to the second object; control a degree of filtering of an adaptive filter based on the second electrical signals; and determine the PnO of the first object based at least in part on the first electrical signals filtered according to the degree of filtering of the adaptive filter.

In some examples, the instructions may be configured to cause the one or more processors to apply a greater degree of filtering of the adaptive filter in response to the second electrical signals indicating a lesser amount of motion by the first object. Applying a greater degree of filtering may cause jitter to be filtered out of the first electrical signals.

In some examples, the second electrical signals may be indicative of at least one of a positional acceleration or a rotational velocity of the first object relative to the second object, and the degree of filtering of the adaptive filter may be controlled based on at least one of the positional acceleration or the rotational velocity of the first object relative to the second object.

In some examples, the second electrical signals may be indicative of both a positional acceleration and a rotational velocity of the first object relative to the second object, and the degree of filtering of the adaptive filter may be controlled based on both the positional acceleration and the rotational velocity of the first object relative to the second object.

In some examples, the apparatus may further include the adaptive filter. In some examples, the apparatus may not include a fixed pre-filter. Additionally or alternatively, the apparatus may further include: the non-magnetic tracking device; the receiver circuit; and a transmitter circuit including a plurality of transmission coils aligned at different transmitter axes, each transmission coil configured to emit a magnetic field along its respective axis. The plurality of receiver elements may be operative to detect magnetic fields emitted by the transmission coils along their respective axes and may generate corresponding first electrical signals for each component of the detected magnetic field.

In some examples, the non-magnetic tracking device may be one of: an inertial sensor, an optical sensor, an acoustic sensor, a radio frequency (RF) sensor, a barometer, a global positioning system (GPS) receiver, a radar chip, a magnetometer.

In some examples, the non-magnetic tracking device may include a first component freely moving with the first object, and a second component having a known position relative to the second object.

In some examples, at least one element of the non-magnetic tracking device may be mechanically coupled to either the receiver circuit or the transmitter circuit.

Another aspect of the disclosure is directed to a method including: receiving, by one or more processors, from an electromagnetic tracking system, first electrical signals indicating a position and orientation (PnO) of a first object within a tracking environment of the electromagnetic tracking system; receiving, by the one or more processors, from a non-magnetic tracking system, second electrical signals; determining, by the one or more processors, an amount of motion of the first object based on the second electrical signals; setting, by the one or more processors, a degree of filtering of an adaptive filter based on the determined amount of motion of the first object; and determining, by the one or more processors, the PnO of the first object based at least in part on the first electrical signals filtered according to the degree of filtering of the adaptive filter.

In some examples, setting the degree of filtering may involve applying a greater degree of filtering of the adaptive filter in response to the second electrical signals indicating a lesser amount of motion by the first object.

In some examples, the second electrical signals may be indicative of at least one of a positional acceleration or a rotational velocity of the first object, and the degree of filtering of the adaptive filter may be set according to the at least one of the positional acceleration or the rotational velocity of the first object.

In some examples, the second electrical signals may be indicative of both a positional acceleration and a rotational velocity of the first object, and the degree of filtering of the adaptive filter may be set according to both the positional acceleration and the rotational velocity of the first object.

In some examples, the second electrical signals may be further indicative of the PnO of the first object, and determining the PnO of the first object may be based on a combination of the PnO indicated by second electrical signals and the first electrical signals filtered according to the degree of filtering of the adaptive filter.

In some examples, the method may further include outputting the determined PnO of the first object.

In some examples, the first electrical signals may be received from a plurality of sensing elements of the electromagnetic tracking system operative to detect magnetic fields emitted by a plurality of transmission coils of the electromagnetic tracking system along different axes. The method may further include: emitting, by the plurality of transmission coils of the electromagnetic tracking system, respective magnetic fields; and detecting, by the plurality of sensing elements of the electromagnetic tracking system, the emitted magnetic fields.

In some examples, the second electrical signals may be received from one of: an inertial sensor, an optical sensor, an acoustic sensor, a radio frequency (RF) sensor, a barometer, a GPS receiver, a radar chip, or a magnetometer.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

DETAILED DESCRIPTION

Figure 1:
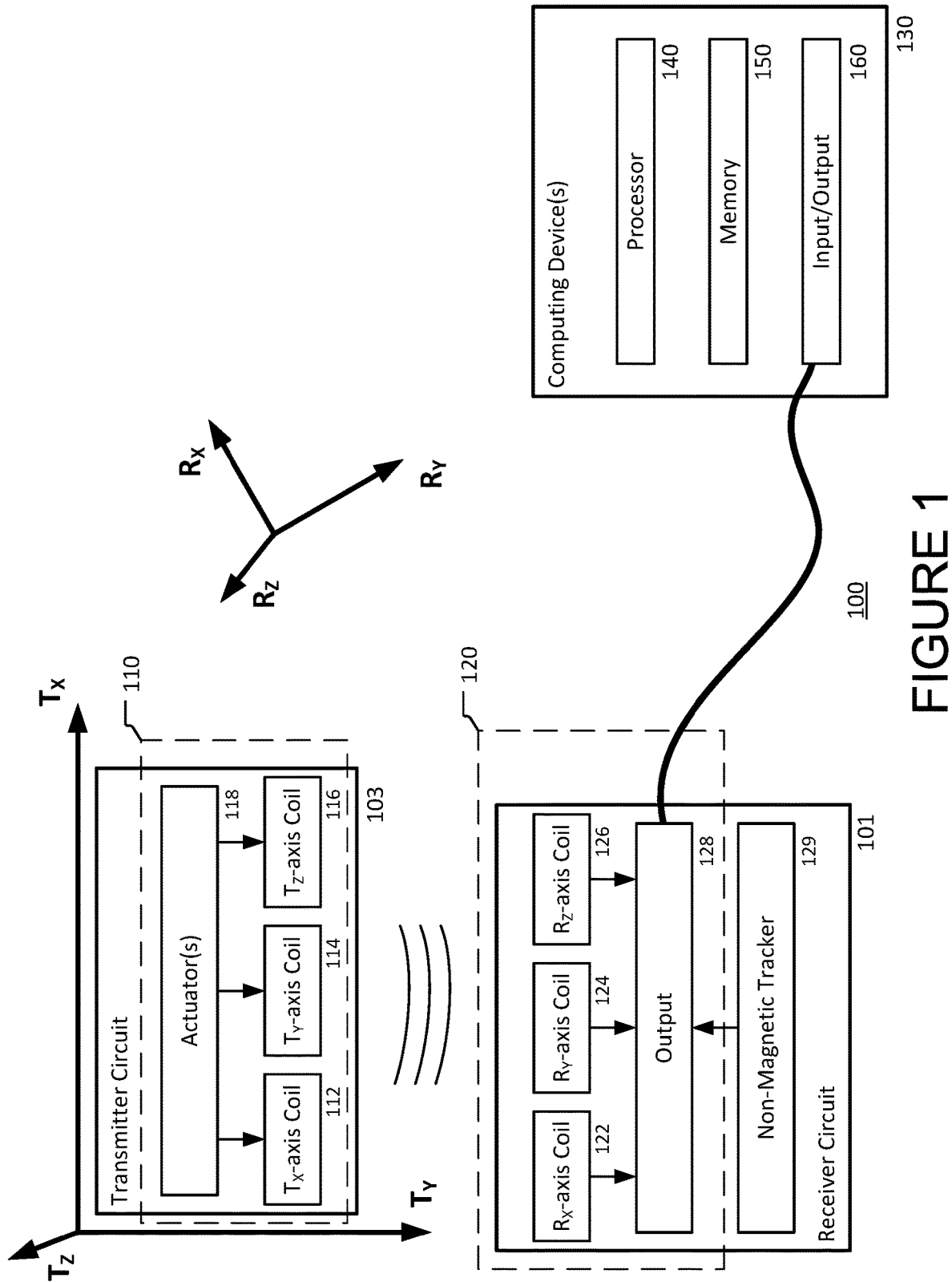
FIG. 1 is a block diagram of an electromagnetic tracking system in accordance with an embodiment of the present disclosure.

FIG. 1 is a block diagram illustrating a system 100 for tracking the position and orientation (PnO) of a first object 101 that is freely movable relative to a second object 103. The system 100 includes each of an electromagnetic tracking system and a non-magnetic tracking system. Each system may be independently capable of tracking a position and/or orientation (PnO) of the first object 101. The PnO of the first object may be characterized in terms of a frame of reference defined by the second object 103. Thus, the PnO of the first object 101 is tracked relative to the second object 103.

The electromagnetic tracking system includes a transmitter circuit 110 for generating an electromagnetic field, and a receiver circuit 120 for sensing the generated electromagnetic field and generating electrical signals based on the sensed electromagnetic field.

In the example of FIG. 1, the transmitter circuit 110 includes a transmitter coil array having a plurality of transmitter coils 112, 114, 116 physically mounted to a second object 103. The transmitter coils are aligned along axes of the transmitter, respectively. In FIG. 1, these axes are denoted $T_X$, $T_Y$ and $T_Z$. The $T_X$, $T_Y$ and $T_Z$ axes may be orthogonal to one another, or they may be different from one another without being orthogonal. Generally, the axes do not all extend within a common plane so that the axes form a three-dimensional frame of reference or coordinate system.

The transmitter circuit 110 may further include an actuating circuit 118 configured to actuate the transmitter coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. The alternating signal applied to each coil causes the coil to produce an electromagnetic field. Because the driving signals differ from one another in frequency, timing, or both, the fields produced by the various coils also differ from one another.

In the example of FIG. 1, the receiver circuit 120 includes a receiver coil array having a plurality of receiver coils 122, 124, 126 mounted to a first object 101 aligned along axes of the receiver circuit, respectively. In FIG. 1, these axes are denoted $R_X$, $R_Y$ and $R_Z$. The $R_X$, $R_Y$ and $R_Z$ axed are fixed relative to the first object 101. As with the transmitter axes, the receiver axes may be orthogonal to one another, or may be different from one another without being orthogonal, but generally form a three-dimensional coordinate system (e.g., do not all extend within a common plane).

Since the receiver coils can be oriented independent of the transmitter coils, it should be understood that the $R_X$, $R_Y$ and $R_Z$ axes of the receiver coil typically are not aligned with the $T_X$, $T_Y$, $T_Z$ axes of the transmitter circuit. Thus, the PnO determined by the electromagnetic tracking system may be characterized in terms of a position and an orientation of the axes of the receiver circuit relative to the axes of the transmitter coils. In this regard, the movement in position or orientation of one or more transmitter coils relative to the receiver coils, or one or more receiver coils relative to the transmitter coils, will influence the PnO solution derived by the system. As such, the transmitter coils and receiver coils are referred to herein as "active elements," whereby the transmitter coils 112, 114 and 116 form one set of active elements of the magnetic locating system, and the receiver coils 122, 124 and 126 form another set of active elements of the magnetic locating system.

The electromagnetic fields generated by the transmitter circuit 110 cause alternating electric current to be generated in the windings of the receiver coils 122, 124, 126. The alternating electric current in each receiver coil typically includes multiple components. Each component is caused by the field generated by one of the transmitter coils. Because the fields generated by the transmitter coils differ from one another in timing, frequency or both, the components of the current in each receiver coil also differ from one another. The system includes conventional elements (not shown) for separating the components of the current in each. The components of the current in coil 122 include a component referred to as $T_X R_X$, representing the current in $R_X$ receiver coil 122 resulting from the field generated by $T_X$ transmitter coil 112; another component $T_Y R_X$ representing the current in $R_X$ receiver coil 122 resulting from the field generated by $T_Y$ transmitter coil 114, and a further component $T_Z R_X$ representing the current in $R_X$ receiver coil 122 resulting from the field generated by $T_Z$ transmitter coil 116. Similarly, the components of the current in $R_Y$ receiver coil 124 include components $T_X R_Y$, $T_Y R_Y$ and $T_Z R_Y$, and the components of the current in $R_Z$ receiver coil 126 include components $T_X R_Z$, $T_Y R_Z$ and $T_Z R_Z$.

In the case of a time-division based transmission, the timing of the electric currents may indicate which of the transmitter coils 112, 114, 116 generated the electromagnetic fields that resulted in the electric current. The system may include a conventional separation circuit synchronized to the timing of the transmitter circuit to separate the components according to the time they are received. In the case of a frequency-division based transmission, the separation circuit may include analog or digital frequency-selective filters. The separation circuit may be provided as part of the receiver circuit 120, or may be included in one or more computing devices 130 discussed herein.

The non-magnetic tracking system includes one or more active elements, at least one of which is depicted in FIG. 1 as a tracking device in the form of block 129. The non-magnetic tracking device 129 may be a conventional inertial locating device including a set of active elements such as linear acceleration sensors and gyroscopic sensors (not shown). In the example of FIG. 1, the device 129 is put in a fixed position relative to the active elements of the receiver circuit 120 of the electromagnetic tracking system. Preferably, the active elements of the non-magnetic tracking device 129 are co-located with the receiver coils, so that a movement of the receiver circuit 120 corresponds to a movement of the non-magnetic tracking device 129. For instance, the device 129 may be mounted on the first object 101 along with the receiver coils 122, 124, 126. In other examples, the non-magnetic tracking system may include one or more other devices having other active elements for monitoring movement of the second object 103, which may or may not be a moving frame of reference (as, for example, if the second object 103 is mounted in a vehicle that may or may not be in motion). Desirably, the non-magnetic tracking system estimates a motion of the first object 101 relative to the second object 103.

In further embodiments, the non-magnetic tracking system may include any one or combination of gyroscopes, accelerometers, barometers, optical sensors and transmitters, acoustic sensors and transmitters, radio frequency (RF) sensors and transmitters, global positioning system (GPS) receivers, radar chips, magnetometers, and other non-magnetic technologies and devices for tracking position and/or orientation of one object relative to another object. For purposes of the present disclosure, the non-magnetic tracking device may additionally or alternatively include magnet-based sensors that do not rely on an electromagnetic transmitter circuit for its sensor readings and that are not sensitive to local electromagnetic distortions within the tracking environment, such as a magnetometer for sensing a magnetic field polarity (such as a magnetic field of the Earth). Each of the active elements of the non-magnetic tracking device may be capable of tracking a motion of the tracked object, in terms of position, orientation, or a combination thereof. Motion of the tracked object may be determined by the non-magnetic tracking system independent of the determinations made by the electromagnetic tracking system.

Each of the electromagnetic tracking system and the non-magnetic tracking system may be connected to one or more computing devices 130 included in the system electronics in order to transmit and receive data with the computing devices. For example, in FIG. 1, the receiver circuit 120 includes an output circuit 128 for receiving generated electric currents and providing the currents as electrical signals to one or more computing devices 130. The output to the computing devices 130 may be an analog or digital signal, depending on the available hardware and software included in each of the output circuit 128 and the computing devices 130. The non-magnetic tracking device 129 is also connected to the one or more computing devices 130 included in the system electronics in order to transmit and receive data with the computing devices 130. The one or more computing devices 130 are configured to receive and process the electrical signals generated by active elements included in or mounted to the first object 101, which includes the receiver circuit 120 and non-magnetic tracking device 129. In the example of FIG. 1, the connection between the magnetic and non-magnetic active elements and the one or more computing devices 130 is shown as a wired connection using a cable, such as a USB Type-C cable. Other cables typically used in electromagnetic tracking systems, or wireless connections, including short range communication protocols such as near-field communication (NFC), WiFi, Bluetooth, Bluetooth LE, may be used. Additionally or alternatively, the transmitter circuit and the receiver circuit may be connected to one another in a wired or wireless manner in order to provide information there between, such as providing phase information from the transmitter to the receiver to avoid phase ambiguity of the electromagnetic field generated by the transmitter.

The magnetic and non-magnetic tracking systems may be configured to ensure that data collected at the same time by the respective systems is compared to one another at the one or more computing devices 130. This may involve wiring the magnetic and non-magnetic systems together to synchronize data collection and transmission, providing time signatures with the collected data, or some combination thereof.

The one or more computing devices 130 of the system electronics may include a processor 140, memory 150, and other components typically present in general purpose computers. The computing devices 130 may further include one or more input/output connections 160 for sending and receiving data from the transmitter circuit, receiver circuit, non-magnetic tracker, or any combination thereof.

The processor 140 may be a well-known processor or other lesser-known types of processors. Alternatively, the processor 140 can be a dedicated controller such as an ASIC. The memory 150 can store information accessible by the processor 140, including data that can be retrieved, manipulated or stored by the processor 140, in accordance with instructions stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data may be stored in computer registers, in a data store as a structure having a plurality of different fields and records, or documents, or buffers. The data may also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data. The instructions may be a set of instructions executed directly, such as machine code, or indirectly, such as scripts, by the processor 140. In this regard, the terms "instructions," "steps," "programs" and "routines" can be used interchangeably herein. The instructions can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

Additionally, the computing device 130 in FIG. 1 is shown as a single block, although it should be appreciated that computing device components may be provided separately from one another or in separate components. For example, the processor 140 may represent multiple processors included in different computing devices and communicatively connected to one another by one or more wired or wireless connections. Additionally or alternatively, data or instructions of the memory may be stored in different computing devices and communicatively connected by one or more wired or wireless connections. For instance, the computing device may include memory 150 storing a database, may be connected to a remote memory storing a database, or both, for the purpose of storing information derived by the processor 140 of the computing device 130. The database may be useful for logging a PnO of the first object 101 over a duration of time, whereby the logged data can be accessed and evaluated at a later time.

Figure 2:
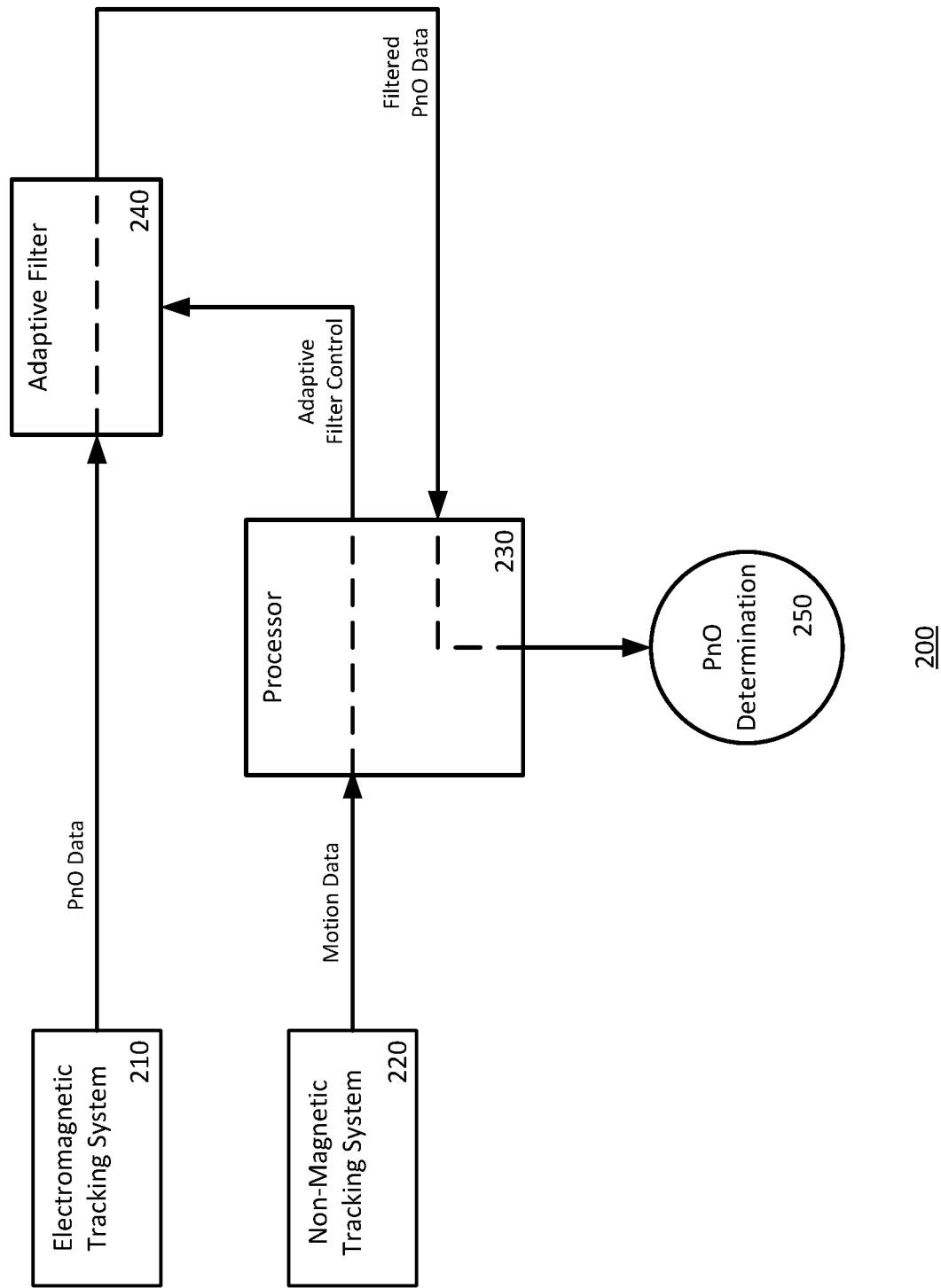
FIG. 2 is a diagram of an example data flow in accordance with an embodiment of the present disclosure.

FIG. 2 is a block diagram illustrating an example data flow in a system 200 of the present disclosure, such as the example system 100 of FIG. 1. The system 200 includes each of an electromagnetic tracking system 210 such as the transmitter 110 and receiver 120 of FIG. 1, a non-magnetic tracking system 220 having one or more non-magnetic tracking devices such as block 129 of FIG. 1, one or more processors 230 and an adaptive filter 240 for filtering noise out of the data received from the electromagnetic tracking system 210.

In operation, the electromagnetic tracking system 210 generates information for determining a position and orientation (PnO) of the receiver circuit 120 relative to the transmitter circuit 110, or vice versa. This information is shown in FIG. 2 as "PnO Data." Typically, the PnO data may be used to construct a signal matrix having an M×N structure (M being the number of coils in the transmitter circuit, N being the number of coils in the receiver circuit, each component of the matrix corresponding to the electrical signal of a different transmitter-receiver coil pairing) from which the PnO of the tracked object may be determined.

The non-magnetic tracking system 220 generates information for determining an amount of motion of the receiver circuit 120 relative to the transmitter circuit 110, or vice versa. This information is shown in FIG. 2 as "Motion Data." The motion data may be indicative of translation, rotation, or a combination thereof. For instance, the non-magnetic tracking system may include an inertial measurement unit (IMU) having accelerometers and gyroscopes for tracking changes in position and orientation of the receiver circuit and, by extension, tracked object. Positional acceleration data from the IMU may be processed to determine translation of the tracked object, and rotational velocity data from the IMU may be processed to determine rotation of the tracked object.

The processor 230 receives the motion data from the non-magnetic tracking system 220. The motion data may be transmitted in the form of one or more electrical signals. The one or more processors 230 and may be configured to determine an amount of motion of the tracked object based on the motion data. For example, a threshold value may be stored and accessed by the one or more processors 230. In such an example, a magnitude of the electrical signals received from the non-magnetic tracking system 220 meeting may be indicative of a high level of motion, and a magnitude of the electrical signals being less than the threshold value may be indicative of a low level of motion. For further example, different magnitudes may be associated with different levels of motion along a range of levels. In further examples, algorithms may process multiple electrical signals from the non-magnetic tracking system 220 to derive an overall level of motion, and the overall level of motion may then be compared to a threshold or associated with a level of motion within a range. Threshold values and associations may be stored in memory accessible to the one or more processors 230.

The one or more processors 230 may further be configured to output a control signal to the adaptive filter 240 in order to control a degree of filtering performed by the adaptive filter 240. For instance, if a relatively high level of motion is detected by the one or more processors 230, then low latency will be favored over low jitter, and the adaptive filter will adjust to little or no filtering, meaning that a relatively high cutoff frequency is applied to the filtered data. Conversely, if a relatively low level of motion is detected by the one or more processors 230, then low jitter will be favored over low latency, and the adaptive filter will adjust to significant filtering, meaning that a relatively low cutoff frequency is applied to the filtered data.

The adaptive filter 240 may be configured to receive the PnO data from the electromagnetic tracking system 210 and to filter the received PnO data according to its setting, which may be controlled by the adaptive filter control signals from the one or more processors 230. The adaptive filter 240 may be configured to function as a low-pass filter, notch filter, band-pass filter, or other type of filter capable of filtering out noise from measurement data over a span of time, so that jitter in the PnO data is filtered out from the relatively lower-frequency components of the electrical signals that reflect motion of the tracked object. In some examples, the adaptive filter 240 may be a software-based function included in the processor(s) 230. For instance, if the PnO data is received via a digital connection, then the digital PnO data may be filtered according to a software routine included in memory of a computing device. In other examples, the adaptive filter may be a circuit, such as an RC circuit capable of performing low-pass filtering operations to analog electrical signals. In such examples, the PnO data may be filtered while the data is still in analog form.

The filtered PnO data output from the adaptive filter 240 may then be processed by the one or more processors 230. For instance, a PnO determination may be derived from the PnO data, such as by using a signal matrix as described in connection with FIG. 1. The PnO determination may indicate each of a determined position and a determined orientation of the tracked object relative to a second object within a tracking environment. Stated another way, the tracked object may be tracked within a frame of reference defined by a position and orientation of the second object.

Although the processor(s) 230 of the system 200 of FIG. 2 are shown as a single block, it should be understood that in some examples, separate processors may be used for the different processing operations shown. For instance, a first processor may be used to process the motion data and issue a control signal to the adaptive filter, and a separate second processor may be used to process the filtered PnO data. In such an example, the first processor may be positioned together with active elements of the electromagnetic tracking system, the non-magnetic tracking system, or both. Additionally, or alternatively, the first processor may be positioned together with the adaptive filter. In any of these examples, the first processors may be positioned together with or separate from the second processor. Additionally, in any of these cases, both the first and second processors may be a type of processor 140 as described in connection with the system 100 of FIG. 1.

To illustrate, an adaptive filter and processor may be connected to the receiver circuit 120 of the system of FIG. 1, and filtered PnO data may be transmitted from the receiver circuit to the computing device 130. Alternatively, the adaptive filter and first processor may be connected between the receiver circuit 120 and the computing device 130. Alternatively, the adaptive filter and first processor may be included with the computing device 130. In any of these examples, the computing device 130 may still include its own processor for determining PnO of the tracked object based on the filtered PnO data received from the adaptive filter.

Figure 3:
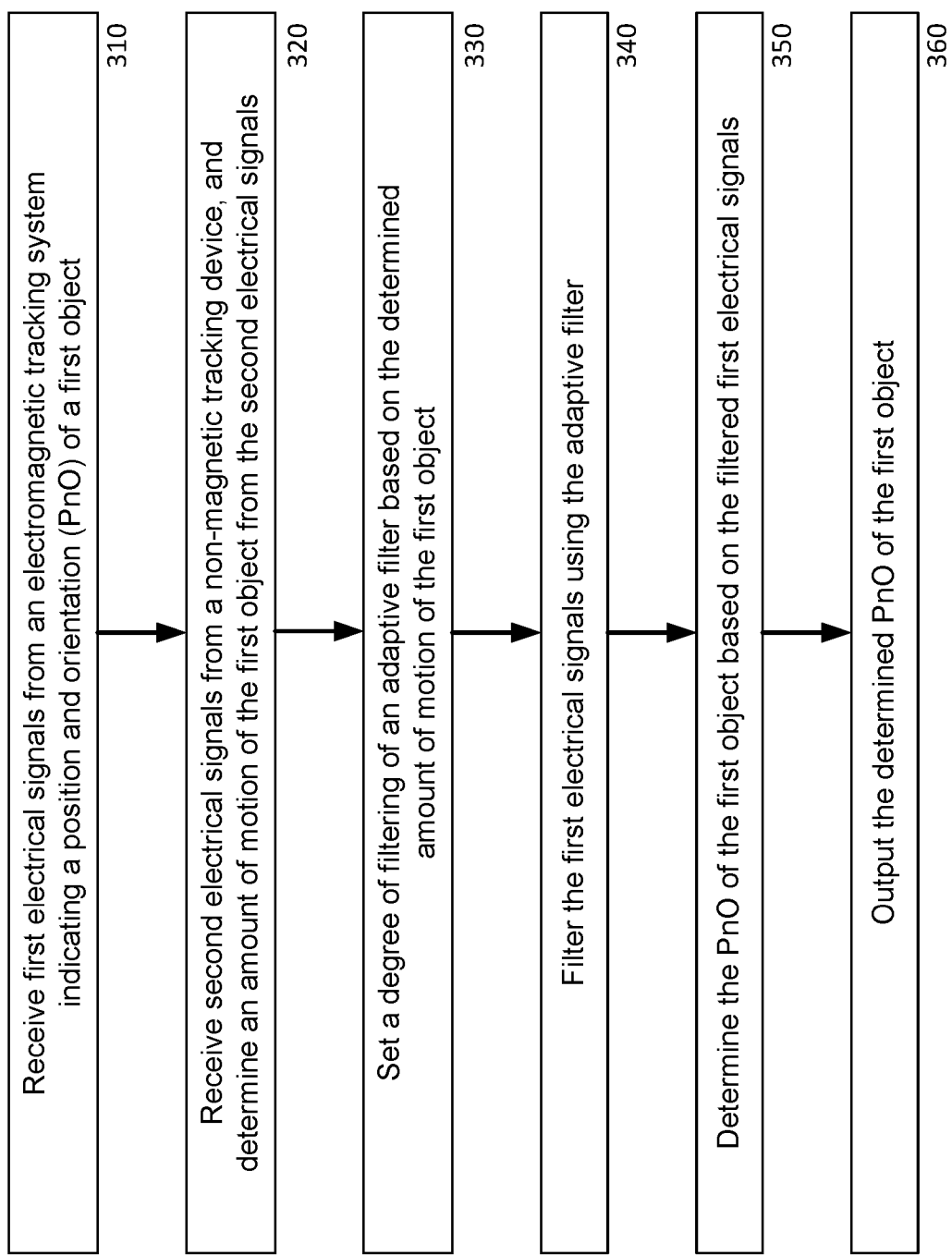
FIG. 3 is a flow diagram of an example routine in accordance with an embodiment of the present disclosure.

FIG. 3 is an example diagram showing an example routine 300 for tracking PnO of a first object. The tracking may be performed within a defined tracking environment, whereby a frame of reference of the first object may be defined by a second object having a known position and orientation relative to the frame of reference. At least some of the operations of routine 300 may be carried out by the computing device 130 shown in FIG. 1, the processor(s) 230 shown in FIG. 2, or both. It should be understood that in other example routines, steps may be added, subtracted, replaced, reordered, or performed at about the same time or in parallel.

At block 310, first electrical signals may be received from the electromagnetic tracking system. For instance, the first electrical signals may be received from a receiver of the electromagnetic tracking system, or in other cases from a transmitter of the system. The first electrical signals may be indicative of a position and an orientation of the tracked first object. For instance, each electrical signal may represent a transmitted electromagnetic field between a given transmitter-receiver coil pair of the electromagnetic tracking system. The electrical signals may include background noise, which may be perceived by a user as jitter, and which may require filtering in order to remove the jitter from the sensor data. While the amount of noise included in the electrical signals may remain relatively constant, this amount of noise may be relatively large compared to actual measurement data in the first electrical signals indicative of motion of the tracked object.

At block 320, second electrical signals may be received from a non-magnetic tracking device of the non-magnetic tracking system. The second electrical signals may be used to determine an amount of motion of the first object, such as a positional velocity, rotational velocity, or combination thereof. The velocity, or more generally amount of motion, determined from the second electrical signals of the non-magnetic tracking system may not be subject to the same attenuation over distance as the measurements derived from of the first electrical signals of the electromagnetic tracking system. As such, the second electrical signals may be more reliable for determining whether the tracked first object is in fact stationary or moving.

At block 330, a degree of filtering is set for an adaptive filter based on the amount of motion determined from the second electrical signals. The adaptive filter may be a low-pass filter, notch filter, band-pass filter, or other type of filter capable of filtering out jitter from sensor data over a span of time. Increasing the degree of filtering may involve lowering a lower-end cutoff frequency of the filter so that more noise is filtered from the transmitted signals and jitter is less impactful on the processed sensor data. Increasing the degree of filtering also has the effect of increasing latency of the system, whereby adapting a setting of the filter has the effect of conducting a tradeoff between low jitter and low latency. When the first object is known to be in motion or is moving fast based on the second electrical signals, low latency is favored since jitter is not expected to impact the sensor data. When the first object is known to not be in motion or is moving slow, low jitter is favored at the cost of latency and the adaptive filter is transitioned to a setting capable of filtering out the background noise.

At block 340, the first electrical signals from the electromagnetic tracking system are filtered by the adaptive filter. As noted above, the amount of filtering performed depends on the degree of filtering set by the control signals of the processors. In some instances, the degree of filtering may drop as far as zero, whereby no filtering is performed. In such a case, the setting of the filter may be "no filter" whereby filtering the first electrical signals according to the degree of filtering of the adaptive filter may involve allowing the entire signal to pass. In other instances, such as when it is determined that the sensors are stationary, the degree of filtering may increase in order to filter out jitter from the sensor data.

At block 350, the filtered first electrical signals (which may include signals that are fully allowed to pass according to the degree of filtering of the adaptive filter) are used to determine the PnO of the first object. PnO determination at this step may be performed using known electromagnetic tracking procedures. To the extent that there are interfering signals, the magnetic field strength is poor due to a long distance between the electromagnetic source and sensors and the sensors are relatively stationary, or a combination of the two, it is expected that jitter will be filtered out by the adaptive filtering process of previous block 340. Therefore, it is expected that the PnO determination at this block is not noisy.

At block 360, the determined PnO of the first object is output. Outputting the PnO may involve providing a visual indication of PnO, or adjusting a display based on changes in the PnO.

The result of the routine 300 is a low latency tracking system that does not require pre-filtering of the sensor measurement data in order to filter out jitter; only the adaptive filter is required. Additionally, the low latency tracking system is capable of adapting the setting of the filter instantaneously based on detected motion, or lack thereof, of the sensors. The non-magnetic tracking data can more reliably indicate when the tracked object is in motion or not in motion, and reduces the need to aggressively filter the PnO data.

The above examples generally describe a system of controlling an adaptive filter based solely on non-magnetic tracking data. However, in other examples, a combination of data from the electromagnetic tracking system and non-magnetic tracking data can be used to determine whether the object is in motion and control the adaptive filter accordingly. The data may be combined using a Kalman filter. For instance, the non-magnetic tracking data may be weighted by the filter to ensure that jitter inherent in the electromagnetic tracking system data does not adversely impact the determination of whether the tracked object is in motion.

Additionally, the above examples generally describe a system deriving a PnO of a tracked object from the electromagnetic tracking system only, and using the non-magnetic tracking system only to control the adaptive filter. However, in other examples, the non-magnetic tracking system can be used to derive the PnO of the tracked object in combination with or in place of the electromagnetic tracking system. For instance, if it is determined that the PnO data is unreliable, then it may be preferable to rely on a system other than the electromagnetic tracking system in order to determine the PnO of the tracked object. In such an instance, and if the non-electromagnetic tracking system provides sufficient motion data for determining PnO of the tracked object, then the one or more processors can determine to use the motion data from the non-magnetic tracking system to determine PnO in place of the PnO data from the electromagnetic tracking system. In other instances, under similar circumstances, the one or more processors may use a combination of PnO data and motion data. The data may be combined using techniques known in the art, such as additional filters and filtering routines. In operation, filtering may involve weighting the PnO and motion data based on detected properties of the data, such as noise, magnetic distortion, rate of change (such as a change in velocity) or other measurable quantities. Additionally or alternatively, filtering operations may rely on motion models, take into account error covariance, or both, in order to evaluate the received data from the various sensor sources and to identify patterns in the data that may indicate the presence of errors for one or a combination of sensor sources, an absence of errors for one or a combination of sensors sources, or both.

The example electromagnetic tracking devices, systems and methods described above may be useful in several applications, including head mounted displays (HMD), devices for surgical navigation (including simulations of surgical procedures), handheld or wearable devices for virtual reality or augmented reality programs, and more. Generally, in such applications, the receiver circuit is mounted to a tracked object, such as a user's helmet or a surgical device, and the transmitter circuit is mounted to a fixed platform, such as a tripod positioned close to the user, or to a frame of vehicle of the user for applications in which the user is travelling. However, due to the reciprocal nature of electromagnetic tracking systems, the transmitter circuit may alternatively be mounted to the moving object and the receiver circuit to the fixed platform. In this manner, in instances where connecting the computing device to the receiver circuit may be difficult for a receiver circuit mounted to a tracked object, it may be possible instead to mount the receiver circuit to the fixed object or vehicle frame.

The above examples also generally describe a system using a receiving coil array including coils in order to detect the magnetic field generated by the transmitter circuit and generate the electrical signals. However, in other examples, the receiver circuit may include an array of sensing elements other than coils. For example, the receiver circuit may include an array of Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:
1. An apparatus comprising:
memory for storing instructions; and
one or more processors for executing the instructions, wherein the instructions stored in the memory are configured to cause the one or more processors to:

receive first electrical signals from a receiver circuit including a plurality of receiver elements aligned at different receiver axes, each receiver element configured to detect a magnetic field along its respective axis, wherein the first electrical signals are indicative of a position and orientation (PnO) of a first object according to a frame of reference defined by a second object;

receive second electrical signals from a non-magnetic tracking device, wherein the second electrical signals are indicative of an amount of motion of the first object relative to the second object;

determine an amount of motion of the first object based on the second electrical signals;

increase an amount of filtering to be performed on the first electrical signals based on the determined amount of motion of the first object decreasing; and decrease an amount of filtering to be performed on the first electrical signals based on the determined amount of motion of the first object increasing, wherein the amount of filtering corresponds to an amount of latency introduced to determination of the PnO of the first object such that an increase in the amount of filtering correlates with an increase in the latency and a decrease in the amount of filtering correlates with a decrease in the latency; and determine the PnO of the first object based at least in part on the first electrical signals filtered according to the amount of filtering.

2. The apparatus of claim 1, wherein the one or more processors are configured to control of the amount of filtering by controlling a cutoff frequency of a low-pass filter, wherein increasing the amount of filtering corresponds to decreasing the cutoff frequency and wherein decreasing the amount of filtering corresponds to increasing the cutoff frequency.

3. The apparatus of claim 1, wherein applying a greater amount of filtering causes a greater amount of jitter to be filtered out of the first electrical signals.

4. The apparatus of claim 1, wherein the second electrical signals are indicative of at least one of a positional acceleration or a rotational velocity of the first object relative to the second object, and wherein the amount of filtering is controlled based on at least one of the positional acceleration or the rotational velocity of the first object relative to the second object.

5. The apparatus of claim 1, wherein the second electrical signals are indicative of both a positional acceleration and a rotational velocity of the first object relative to the second object, and wherein the amount of filtering is controlled based on both the positional acceleration and the rotational velocity of the first object relative to the second object.

6. The apparatus of claim 1, further comprising an adaptive filter.

7. The apparatus of claim 6, wherein the apparatus does not include a fixed pre-filter.

8. The apparatus of claim 6, further comprising:
the non-magnetic tracking device;
the receiver circuit; and
a transmitter circuit including a plurality of transmission coils aligned at different transmitter axes, each transmission coil configured to emit a magnetic field along its respective axis, wherein the plurality of receiver elements are operative to detect magnetic fields emitted by the transmission coils along their respective axes and generate corresponding first electrical signals for each component of the detected magnetic field.

9. The apparatus of claim 8, wherein the non-magnetic tracking device is one of: an inertial sensor, an optical sensor, an acoustic sensor, a radio frequency (RF) sensor, a barometer, a global positioning system (GPS) receiver, a radar chip, or a magnetometer.

10. The apparatus of claim 8, wherein the non-magnetic tracking device includes a first component freely moving with the first object, and a second component having a known position relative to the second object.

11. The apparatus of claim 8, wherein at least one element of the non-magnetic tracking device is mechanically coupled to either the receiver circuit or the transmitter circuit.

12. A method comprising:
receiving, by one or more processors, from an electromagnetic tracking system, first electrical signals indicating a position and orientation (PnO) of a first object within a tracking environment of the electromagnetic tracking system;

receiving, by the one or more processors, from a non-magnetic tracking system, second electrical signals;

determining, by the one or more processors, an amount of motion of the first object based on the second electrical signals;

determining, by the one or more processors, an amount of motion of the first object based on the second electrical signals;

increasing, by the one or more processors, an amount of filtering to be performed on the first electrical signals based on the determined amount of motion of the first object decreasing;

decreasing, by the one or more processors, the amount of filtering to be performed on the first electrical signals based on the determined amount of motion of the first object increasing, wherein the amount of filtering to be performed increases as the amount of motion by the first object decreases; and determining, by the one or more processors, the PnO of the first object based at least in part on the first electrical signals filtered according to the set amount of filtering.

13. The method of claim 12, wherein setting the amount of filtering comprises setting a cutoff frequency of a low-pass filter, wherein increasing the amount of filtering corresponds to decreasing the cutoff frequency and wherein decreasing the amount of filtering corresponds to increasing the cutoff frequency.

14. The method of claim 12, wherein the second electrical signals are indicative of at least one of a positional acceleration or a rotational velocity of the first object, and wherein the amount of filtering is set according to the at least one of the positional acceleration or the rotational velocity of the first object.

15. The method of claim 12, wherein the second electrical signals are indicative of both a positional acceleration and a rotational velocity of the first object, and wherein the amount of filtering is set according to both the positional acceleration and the rotational velocity of the first object.

16. The method of claim 12, wherein the second electrical signals are further indicative of the PnO of the first object, and wherein determining the PnO of the first object is based on a combination of the PnO indicated by second electrical signals and the first electrical signals filtered according to the amount of filtering.

17. The method of claim 12, further comprising outputting the determined PnO of the first object.

18. The method of claim 12, wherein the first electrical signals are received from a plurality of sensing elements of the electromagnetic tracking system operative to detect magnetic fields emitted by a plurality of transmission coils of the electromagnetic tracking system along different axes.

19. The method of claim 18, further comprising:
   emitting, by the plurality of transmission coils of the electromagnetic tracking system, respective magnetic fields; and
   detecting, by the plurality of sensing elements of the electromagnetic tracking system, the emitted magnetic fields.

20. The method of claim 12, wherein the second electrical signals are received from one of: an inertial sensor, an optical sensor, an acoustic sensor, a radio frequency (RF) sensor, a barometer, a GPS receiver, a radar chip, or a magnetometer.

* * * * *